(12) United States Patent
Dauner

(10) Patent No.: US 9,399,237 B1
(45) Date of Patent: Jul. 26, 2016

(54) WHEEL MASKING SYSTEM

(76) Inventor: Aaron D. Dauner, Madison, MS (US)

(*) Notice: Subject to any disclaimer, the term of this patent is extended or adjusted under 35 U.S.C. 154(b) by 278 days.

(21) Appl. No.: 13/568,460

(22) Filed: Aug. 7, 2012

(51) Int. Cl.
B05B 15/04 (2006.01)
B60B 7/00 (2006.01)

(52) U.S. Cl.
CPC .. *B05B 15/04* (2013.01); *B60B 7/00* (2013.01)

(58) Field of Classification Search
CPC ............ B60B 7/04; B69B 7/06; B50B 7/068; B05B 15/0487
USPC .................. 301/37.101, 37.102, 37.22, 37.23, 301/37.34, 37.12, 37.103, 37.104, 37.106, 301/37.372; 118/504, 505
See application file for complete search history.

(56) References Cited

U.S. PATENT DOCUMENTS

| 338,185 | A | | 3/1886 | Otterson |
| 3,192,896 | A | | 7/1965 | Irving |
| D239,754 | S | | 5/1976 | Yoder |
| 4,811,991 | A | | 3/1989 | Moreno |
| 4,874,206 | A | * | 10/1989 | Sampson ................. 301/37.103 |
| 5,039,172 | A | * | 8/1991 | Krieger ..................... 301/37.11 |
| D340,439 | S | | 10/1993 | Carbone |
| 5,328,723 | A | | 7/1994 | Horiki |
| 5,368,370 | A | * | 11/1994 | Beam ......................... 301/37.36 |
| 5,423,599 | A | * | 6/1995 | Sherod et al. ............ 301/37.103 |
| 5,435,630 | A | * | 7/1995 | Tucker ..................... 301/37.103 |
| 5,667,590 | A | | 9/1997 | Simons, Sr. |
| 5,766,358 | A | | 6/1998 | Oliver |
| 6,179,387 | B1 | * | 1/2001 | Nasset et al. ............ 301/37.102 |
| 6,299,951 | B1 | | 10/2001 | Dauner |
| 6,692,085 | B1 | * | 2/2004 | Threadgill ................ 301/37.103 |
| 6,971,914 | B1 | * | 12/2005 | Chou et al. ................ 439/607.01 |
| 7,618,099 | B1 | * | 11/2009 | Acosta ..................... 301/37.372 |
| 8,449,043 | B2 | * | 5/2013 | McCorry et al. ......... 301/37.106 |
| 8,496,300 | B2 | * | 7/2013 | Nebel ....................... 301/37.104 |
| 2003/0020322 | A1 | * | 1/2003 | Zaniboni .................. 301/37.101 |
| 2004/0164607 | A1 | * | 8/2004 | Stewart, Jr. ........... B60B 7/0073 301/37.103 |
| 2006/0145528 | A1 | * | 7/2006 | Dangleman .............. 301/37.101 |
| 2008/0136247 | A1 | * | 6/2008 | Janty ........................ 301/37.104 |

* cited by examiner

*Primary Examiner* — S. Joseph Morano
*Assistant Examiner* — Jean Charleston
(74) *Attorney, Agent, or Firm* — Neustel Law Offices; Jason L. Gilbert

(57) ABSTRACT

A wheel masking system for more efficiently and effectively masking vehicle wheels for painting and touch-ups. The wheel masking system generally includes a tire mask and rim shield which may be simultaneously or interchangeably utilized to mask portions of a wheel during paint or touch-up operations. The tire mask includes a disc member which fits the contour of the wheel's side wall and tapers to nest at the tire bead on the inside diameter to protect portions of the wheel and side wall from paint. The rim shield fits over the lug nuts of the wheel to mask the rim of the wheel from paint.

13 Claims, 6 Drawing Sheets

WHEEL MASKING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to devices for wheel masking and more specifically it relates to a wheel masking system for more efficiently and effectively masking vehicle wheels for painting and touch-ups.

2. Description of the Related Art

Any discussion of the related art throughout the specification should in no way be considered as an admission that such related art is widely known or forms part of common general knowledge in the field.

When painting or touching up vehicle wheels, paint will often inadvertently contact areas which are not meant to be painted. This problem may be exacerbated when a spray paint device is used to deliver the paint, as is common in application of paint to vehicles. In the past, various devices and methods have been utilized to prevent such inadvertent painting. For example, it is common to mask areas which are not to be painted with removable tape.

While individual devices have been introduced to ease masking of wheels during painting, there does not appear to be any prior art system which allows the efficient masking of multiple areas on a vehicle wheel during painting. For example, U.S. Pat. No. 6,299,951 was granted to the inventor of the present application for "Truck Hub Paint Mask Device" which masks the hub of a vehicle wheel during painting. The present invention provides a pair of other devices which, when used in combination with the Truck Hub Paint Mask Device, provides a complete masking system to be used while painting a vehicle wheel.

Because of the inherent problems with the related art, there is a need for a new and improved wheel masking system for more efficiently and effectively masking vehicle wheels for painting and touch-ups.

BRIEF SUMMARY OF THE INVENTION

The invention generally relates to a wheel masking system which includes a tire mask and rim shield which may be simultaneously or interchangeably utilized to mask portions of a wheel during paint or touch-up operations. The tire mask is comprised of a disc member which fits the contour of the wheel's side wall and tapers to nest at the tire bead on the inside diameter to protect portions of the wheel and side wall from paint. The rim shield fits over the lug nuts of the wheel to mask the rim of the wheel from paint.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
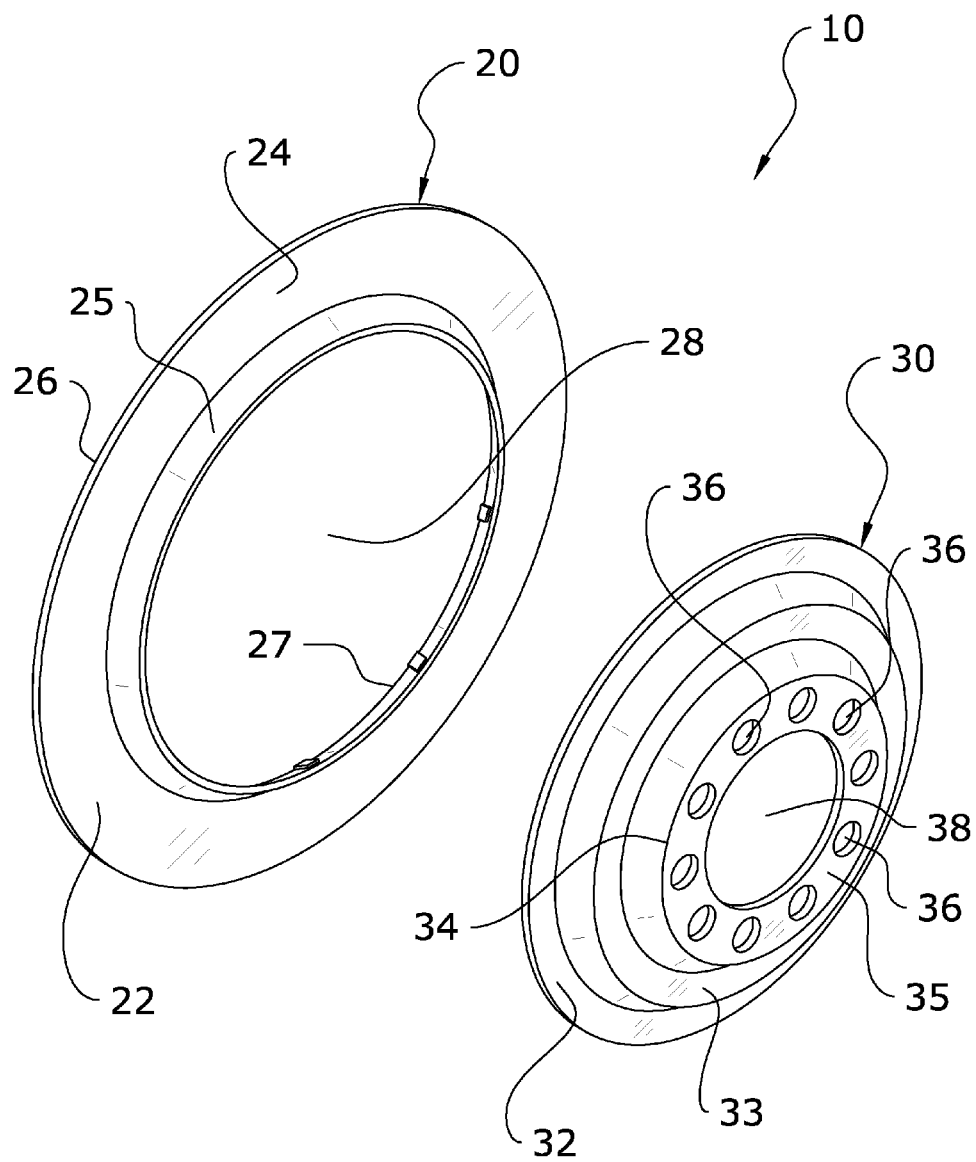
FIG. 1 is an upper perspective view of the present invention.

Turning now descriptively to the drawings, in which similar reference characters denote similar elements throughout the several views, FIGS. 1 through 6 illustrate a wheel masking system 10, which comprises a tire mask 20 and rim shield 30 which may be simultaneously or interchangeably utilized to mask portions of a wheel 12 during paint or touch-up operations. The tire mask 20 is comprised of a disc member 22 which fits the contour of the wheel's 12 side wall and tapers to nest at the tire bead on the inside diameter to protect portions of the wheel 12 and side wall 12 from paint. The rim shield 30 fits over the lug nuts 14 of the wheel 12 to mask the rim of the wheel 12 from paint.

B. Wheel Mask

As shown in FIG. 1, the present invention generally includes a tire mask 20 for removably attaching to and covering portions of a wheel 12 during painting. The tire mask 20 preferably fits the contour of the wheel 12 side wall and tapers to nest at the tire bead on the inside diameter.

Figure 4:
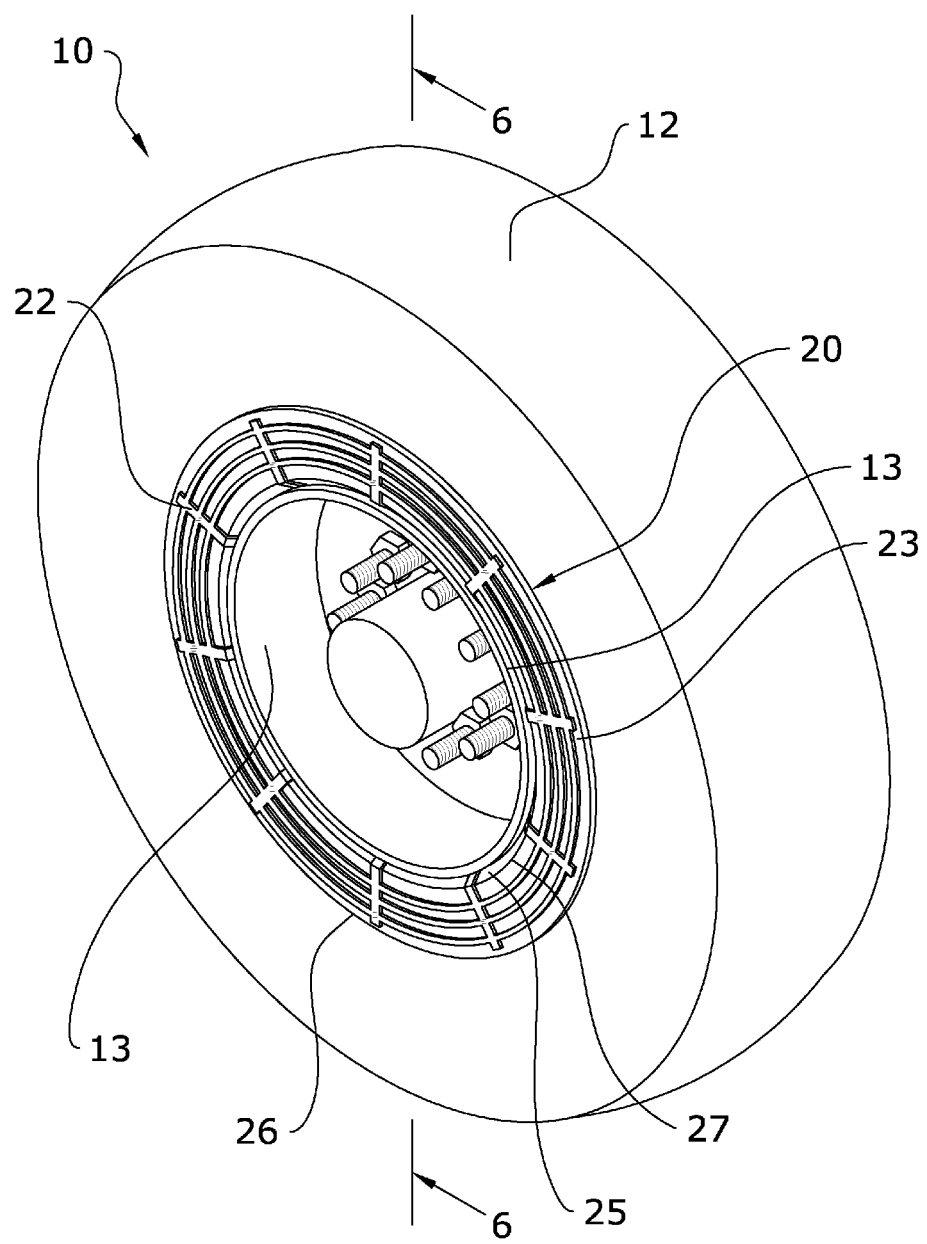
FIG. 4 is an upper perspective view of the tire mask of the present invention installed on a wheel.
Figure 5:
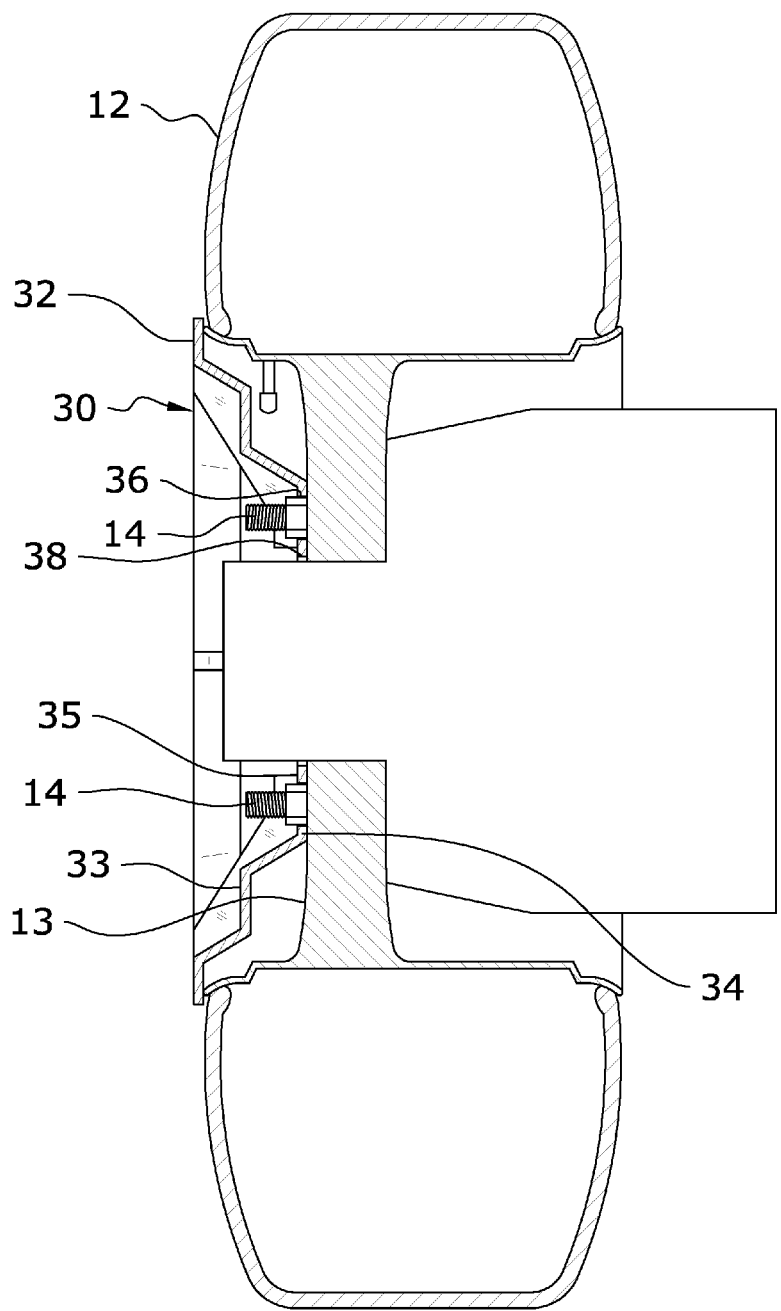
FIG. 5 is a side sectional view taken along line 5-5 of FIG. 3.
Figure 6:
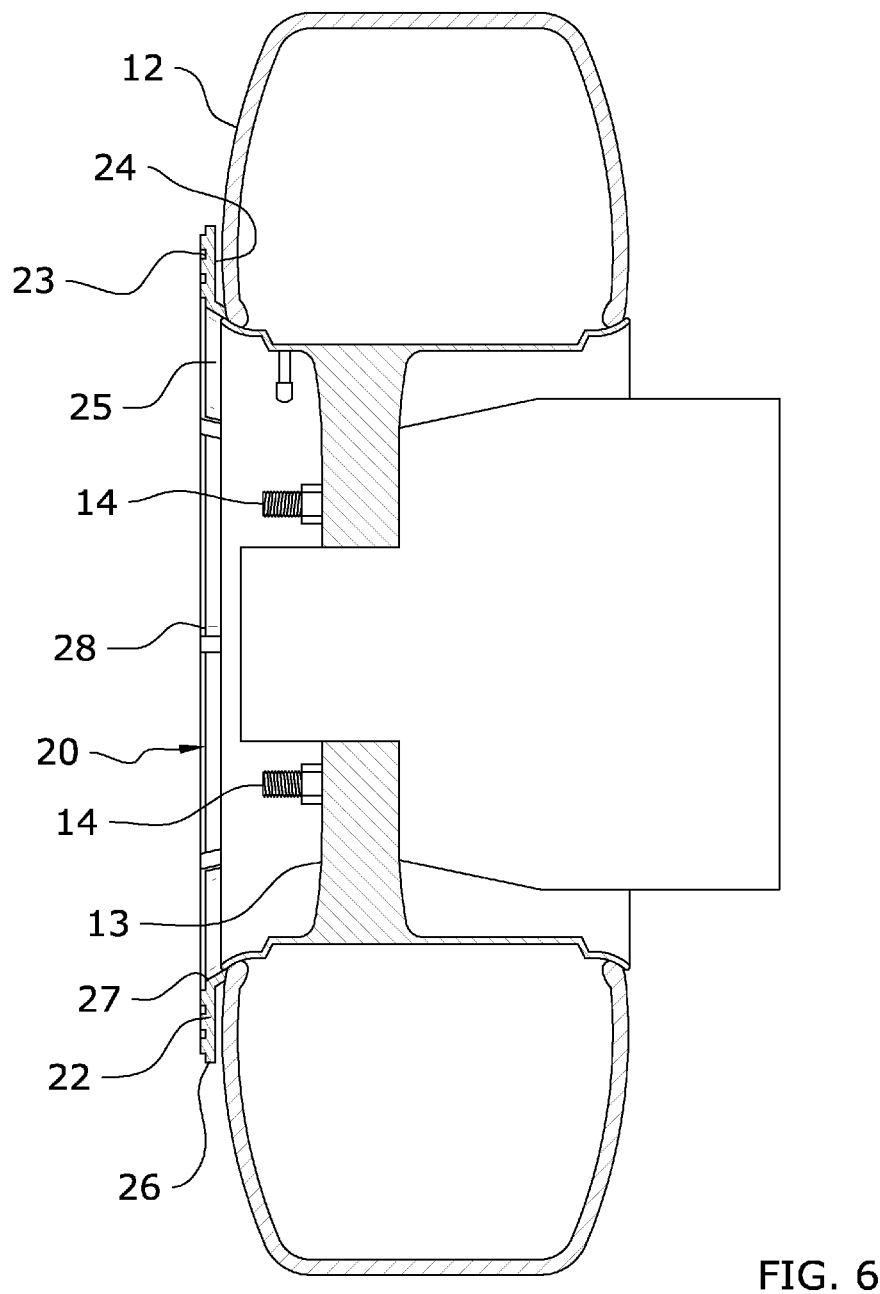
FIG. 6 is a side sectional view taken along line 6-6 of FIG. 4.

The tire mask 20 is generally comprised of a disc member 22 having an outer surface 23 and an inner surface 24. The inner surface 24 will abut against the wheel 12 when the tire mask 20 is installed thereon as shown in FIG. 4. The outer surface 23 will face out and away from the wheel 12 to receive unwanted paint during painting of the wheel 12.

The tire mask 20 will preferably be comprised of a flexible material which is adapted to not warp or become otherwise compromised through repeated exposure to paint or other chemicals. In a preferred embodiment, the tire mask 20 will be comprised of rubber.

The disc member 22 of the tire mask 20 is generally comprised of a ring-like structure as shown in the figures. The tire mask 20 includes an outer edge 26 along its outer peripheral edge and an inner edge 27 along its inner peripheral edge, as shown in FIG. 1. A central opening 28 is defined by the inner edge 27. As shown in the figures, the tire mask 20 may also include stiffening ribs along its outer body to increase durability.

The size and shape of the tire mask 20 may vary for different applications and different types of wheels 12. Thus, the scope of the present invention should not be construed as limited by the exemplary figures submitted herewith. The present invention is adapted for use with any sized wheel 12 and may be so applied, including for example on wheels 12 as small as tricycle wheels 12 and larger wheels 12 such as is commonly used with construction and farming equipment.

Figure 2:
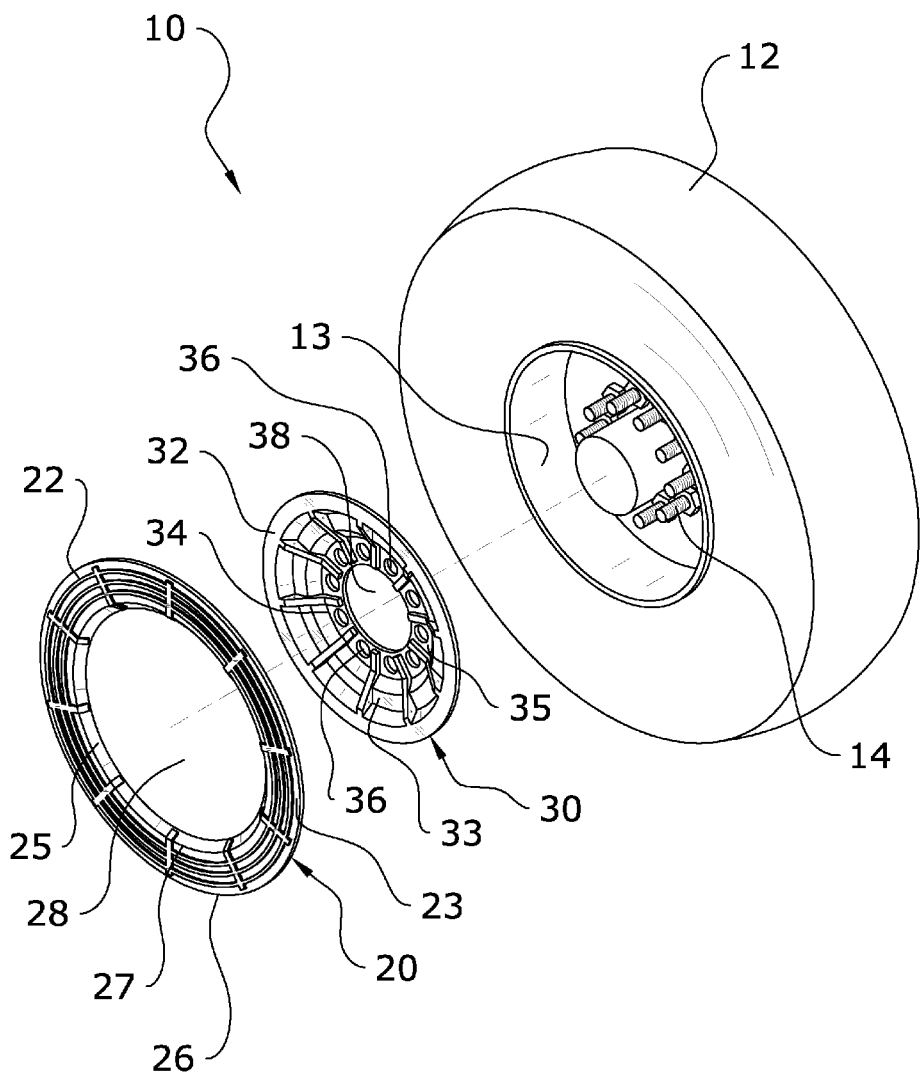
FIG. 2 is an upper perspective view illustrating alignment of the present invention with a wheel.
Figure 3:
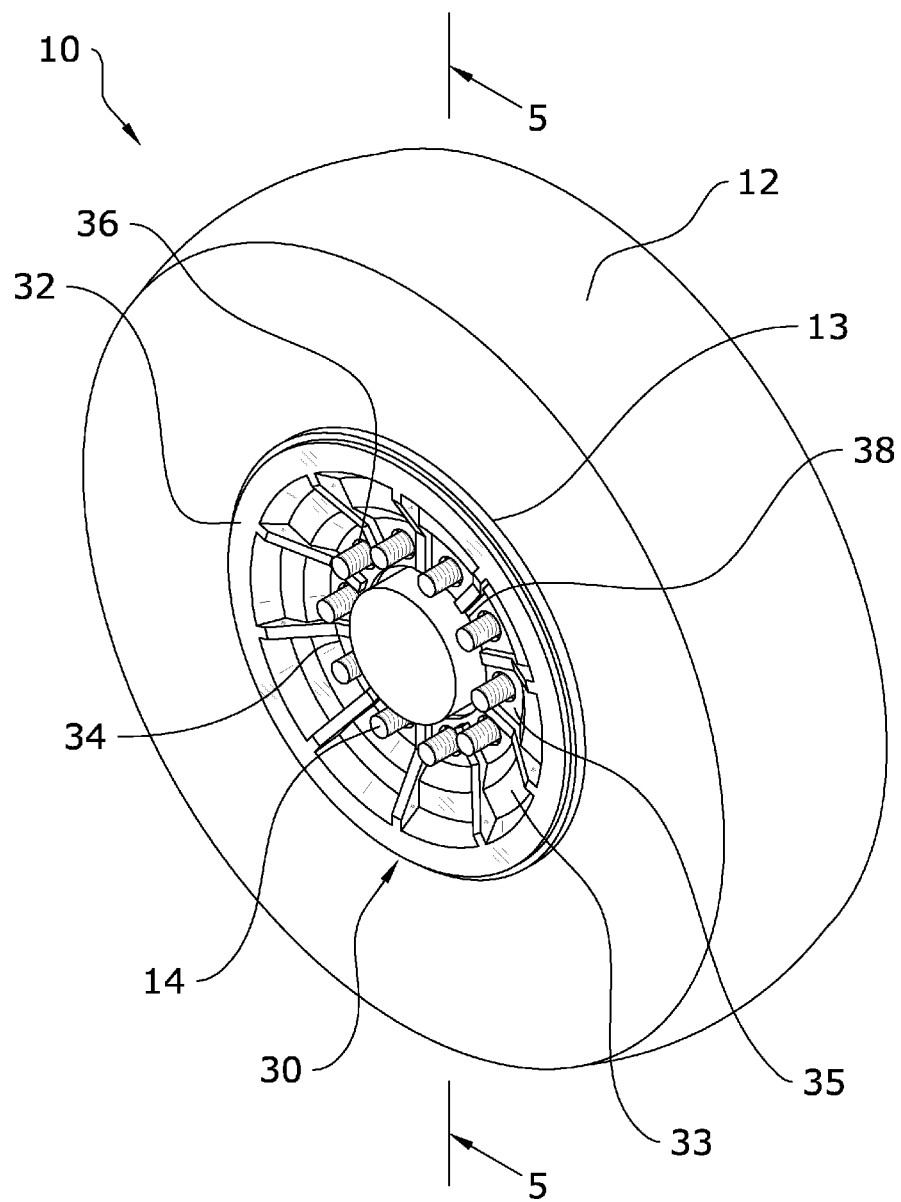
FIG. 3 is an upper perspective view of the rim shield of the present invention installed on a wheel.

As shown in FIG. 2, the tire mask 20 includes a flange 25 extending inwardly from the inner edge 27. The flange 25 provides additional protection from paint and is adapted to closely follow the contour of the wheel 12. In some embodiments, the flange 25 may be angularly disposed.

C. Rim Shield

As shown in FIG. 1, the present invention will also generally include a rim shield 30 which is applied over the hub 13 of the wheel 12 and maintained in place by friction fit with the lug nuts 14. As shown in FIG. 2, the rim shield 30 includes an outer rim 32 and an inner rim 35. The inner rim 35 defines a central opening 38 through which the axle of the wheel 12 will extend when the rim shield 30 is installed.

The rim shield 30 will preferably be comprised of a flexible material which is adapted to not warp or become otherwise compromised through repeated exposure to paint or other chemicals. In a preferred embodiment, the rim shield 30 will be comprised of rubber.

The rim shield 30 is preferably tapered from its outer rim 32 to its inner rim 35 as shown in the figures so as to cover the side walls of the wheel 12 hub 13. A plurality of apertures 36 are positioned adjacent to the inner rim 35. The lug nuts 14 of the wheel 12 will extend through and frictionally engage with the apertures 36 to retain the rim shield 30 on the wheel 20 during use. The positioning and numbering of the apertures 36 will vary depending on the application of the present invention, and thus should not be construed as being limited by the exemplary figures.

In a preferred embodiment as shown in the figures, the rim shield 30 will be comprised of a multiple-flanged configuration. Specifically, an outer flange 33 will extend inwardly from the outer rim 32. An inner flange 34 will similarly extend inwardly from the outer flange 33, terminating with the inner edge 27 as shown in FIG. 2. Such a configuration ensures that the side walls of the wheel 12 are covered during painting operations.

The size and shape of the rim shield 30 may vary for different applications and different types of wheels 12. Thus, the scope of the present invention should not be construed as limited by the exemplary figures submitted herewith. The present invention is adapted for use with any sized wheel 12 and may be so applied, including for example on wheels 12 as small as tricycle wheels 12 and larger wheels 12 such as is commonly used with construction and farming equipment.

D. Operation of Preferred Embodiment

In use, the tire mask 20 is first secured to the wheel 12 through use of a fastener such as masking tape. The rim shield 30 is applied over the hub 13 and lug nuts 14 and maintained thereon through friction fit of the lug nuts 14 through its apertures 36. The tire mask 20 and rim shield 30 may be utilized interchangeable or together. In either case, when one or both is installed, paint may be applied to portions of the wheel hub 13 and/or lug nuts 14 which need painting or touching up. After painting is completed, the tire mask 20 and/or rim shield 30 may be removed and either disposed of or retained for future use.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A wheel masking system, comprising:
   a tire mask for covering an inner edge of a wheel, wherein said tire mask is comprised of a disc shape;
   a flange extending inwardly from an inner edge of said tire mask, wherein said tire mask covers a bead of said wheel; and
   a rim shield for covering a hub of a wheel, wherein said rim shield includes an outer edge and an inner edge, wherein said rim shield tapers from said outer edge to said inner edge, wherein said rim shield includes an outer flange extending from said outer edge to define a first raised portion, wherein said rim shield includes an inner flange extending from said outer flange to define a second raised portion, wherein said rim shield includes a plurality of apertures on said second raised portion adjacent said inner edge for receiving lug nuts.

2. The wheel masking system of claim 1, wherein said tire mask is comprised of a flexible material.

3. The wheel masking system of claim 2, wherein said tire mask is comprised of rubber.

4. The wheel masking system of claim 1, wherein said rim shield is comprised of a flexible material.

5. The wheel masking system of claim 4, wherein said rim shield is comprised of rubber.

6. The wheel masking system of claim 1, wherein said tire mask includes an outer edge, wherein said inner edge of said tire mask defines a central opening.

7. The wheel masking system of claim 1, wherein said rim shield includes a central opening defined by said inner edge.

8. A wheel masking system, comprising:
   a tire mask for covering an inner edge of a wheel, wherein said tire mask is comprised of a disc shape, wherein said tire mask includes an outer edge and an inner edge, wherein said inner edge defines a central opening;
   a flange extending inwardly from said inner edge of said tire mask, wherein said tire mask covers a bead of said wheel; and
   a rim shield for covering a hub of a wheel, wherein said rim shield includes an outer edge and an inner edge, wherein said rim shield tapers from said outer edge to said inner edge, wherein said rim shield includes a central opening defined by said inner edge, wherein said rim shield includes an outer flange extending from said outer edge to define a first raised portion, wherein said rim shield includes an inner flange extending from said outer flange to define a second raised portion, wherein said rim shield includes a plurality of apertures on said second raised portion adjacent said inner edge for receiving lug nuts.

9. The wheel masking system of claim 8, wherein said tire mask is comprised of a flexible material.

10. The wheel masking system of claim 9, wherein said tire mask is comprised of rubber.

11. The wheel masking system of claim 8, wherein said rim shield is comprised of a flexible material.

12. The wheel masking system of claim 11, wherein said rim shield is comprised of rubber.

13. A wheel masking system, comprising:

a flexible tire mask for covering an inner edge of a wheel, wherein said tire mask is comprised of a disc shape, wherein said tire mask includes an outer edge and an inner edge, wherein said inner edge defines a central opening, wherein said tire mask includes a flange extending from said inner edge, wherein said tire mask covers a bead of said wheel; and a flexible rim shield for covering a hub of a wheel, wherein said rim shield includes an outer edge and an inner edge, wherein said rim shield tapers from said outer edge to said inner edge, wherein said rim shield includes a central opening defined by said inner edge, wherein said rim shield includes an outer flange extending from said outer edge flange to define a first raised portion, wherein said rim shield includes an inner flange extending from said outer flange to define a second raised portion, wherein said rim shield includes a plurality of apertures on said second raised portion adjacent said inner edge for receiving lug nuts.

* * * * *